United States Patent [19]

Joung

[11] Patent Number: 4,747,438
[45] Date of Patent: May 31, 1988

[54] STRUCTURE OF AUTOMOBILE TIRE FRICTION-INCREASING AUXILIARY DEVICE

[76] Inventor: Lai Fu Joung, 414, Hsin I Rd., Sec. 4, Taipei, Taiwan

[21] Appl. No.: 908,677

[22] Filed: Sep. 18, 1986

[51] Int. Cl.⁴ .......................................... B60C 27/20
[52] U.S. Cl. .................................. 152/228; 152/218; 152/225 C; 152/230; 301/44 R; 301/46; 403/92; 403/96
[58] Field of Search ................. 152/208, 218, 225 R, 152/225 C, 213 R, 216, 217, 220, 226–230; 24/68 CD, 115 M, 136 R; 403/92, 93, 96; 301/38 R, 41 R, 43, 44 R, 44 T, 45, 46

[56] References Cited

U.S. PATENT DOCUMENTS

| | | | |
|---|---|---|---|
| 2,394,995 | 2/1946 | Guinn | 301/46 |
| 2,616,476 | 11/1952 | Gerds | 152/228 |
| 2,873,783 | 2/1959 | O'Higgins | 152/218 |
| 3,047,037 | 7/1962 | Frederick | 152/225 C X |
| 4,387,930 | 6/1983 | Hunt | 301/46 |
| 4,662,417 | 5/1987 | Lee | 152/230 X |
| 4,694,872 | 9/1987 | Granryd | 152/213 A X |

*Primary Examiner*—Donald E. Czaja
*Assistant Examiner*—Thomas Bokan
*Attorney, Agent, or Firm*—Holman & Stern

[57] ABSTRACT

The present invention relates to an improved structure of an automobile tire auxiliary device, especially relates to such a device capable of holding the tire to step up the friction force of the tire through a recess and an adjustable lug on the claw plates so that the automobile can pass through the land of snow, sand, mud and swamp or upward slope by virtue of poking the sand and earth.

1 Claim, 3 Drawing Sheets

STRUCTURE OF AUTOMOBILE TIRE FRICTION-INCREASING AUXILIARY DEVICE

BACKGROUND OF THE INVENTION

Nowadays there is an automobile tire auxiliary device (as disclosed in the U.S. Pat. No. 2,873,783) specially for holding the tire to step up the friction force between the tire and the ground. However, it has not any structural design on the outer edge of claw thereof to poke the sand and earth, the expected ideal friction resistance still cannot be achieved while the automobile is driven on the land of snow, sand, mud and swamp or upward slope. Therefore, it has to be improved and renewed.

In view of the fact that the practical use and function of conventional automobile tire auxiliary device leaves much to be desired, this inventor who has been engaged in the research of various mechanical equipment for a number of years, unremittingly dedicated himself to the experiment and research for improvement concerned in a plurality of aspects, and eventually invented an improved structure of an automobile tire auxiliary device which is characterized by a recess on the outer edge of a claw thereof and an adjustable lug thereon so as to poke the sand and earth as well as the ice and snow, to step up the friction resistance thereof, and to prevent the automobile from sliding while it is driven on the land of snow, sand, mud and swamp or upward slope.

SUMMARY OF THE INVENTION

An improved structure of an automobile tire auxiliary device is characterized by a recess in the center of outer edge surface of a claw plate and an adjustable lug thereon so as to poke the sand and earth as well as the ice and snow and to step up the friction resistance thereof while the automobile is driven on the land of snow, sand, mud and swamp or upward slope.

DETAILED DESCRIPTION OF THE PREFERRED EMBODIMENT

Figure 1:
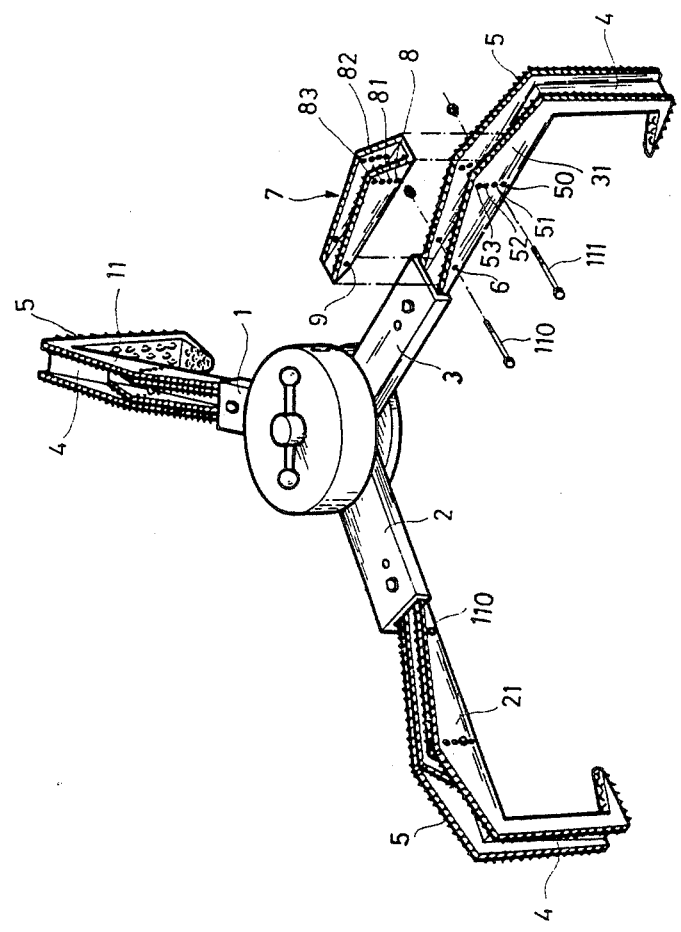
FIG. 1 is a structural view of the present invention.
Figure 2:
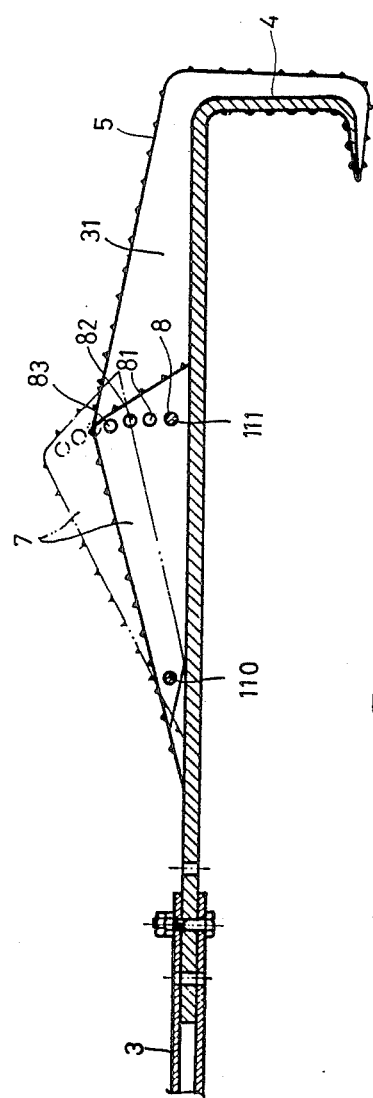
FIG. 2 is a sectional view of adjusting the up-and-down positions of a lug of the present invention.
Figure 3:
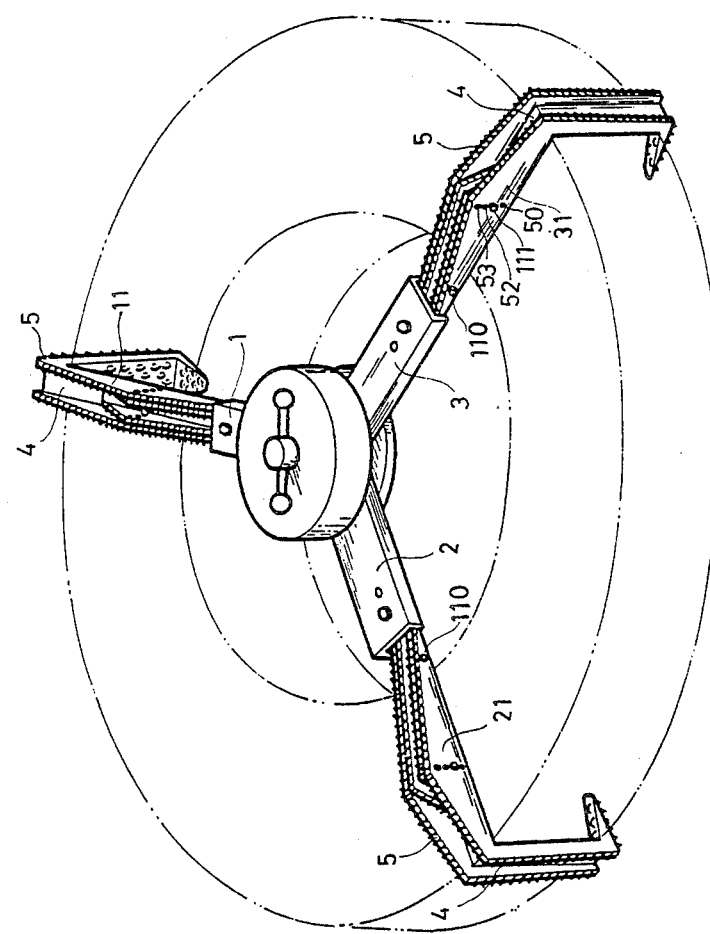
FIG. 3 is an example of this invention when holding the tire.

As shown in FIG. 1, a recess(4) is provided to the center of an outer edge surface of claw plates (1)(2)(3) of the present invention, the outer edge surface on the two sides of said recess (4) is provided with some toothed faces (5). And two rows of symmetrical holes (50)(51)(52) (53) and a symmetrical fixing cotter hole (6) provided on the surface of inner cleatings (11)(21)(31) of the claw plates (1)(2)(3) enable the triangular lug (7) to engage with the claw plates (1)(2)(3) to be an integral body through a cotter (110) locked in the fixing cotter hole (6) and a pin (111) locked in the adjusting holes (50)(51)(52) (53). The said lug (7) with a hollow top surface has two rows of adjustable symmetrical holes (8)(81)(82)(83) and a symmetrical fixing cotter hole (9) on its two side surfaces. Therefore, while the automobile is driven on the land of mud and swamp or deeper sand, the pin (111) may be removed to adjust the height of lug (7) as shown in FIG. 2 so that the lug (7) can extend out of the outer edge of claw plates (1)(2)(3) and when contact with the ground, hold the earth to step up the friction resistance thereof, depending on the situation. Provided it is unnecessary to use the lug (7), the pin (111) may be removed once again to change its inserting hole so as to hide the lug (7) in the side surface of inner cleatings (11)(21)(31) of the claw plates (1)(2)(3), without occupying the space of other parts.

In view of the above, it is obvious that the primary object of the present invention is to offer an improved structure of automobile tire auxiliary device with an adjustable height of a lug so as to step up the holding and friction force of the tire while the automobile is driven on the land of mud and swamp of deeper sand.

The secondary object of the present invention is to take advantage of the lug structure of the present invention to adjust the lug up and down, and when it is unnecessary to use the lug, such a lug can be hidden in the claw plate, without occupying the space of other parts but in favor of storage and forwarding.

In summary, the present invention with the foregoing excellent characteristics can step up better holding and friction function in practice and is a design of product structure with an extremely practicable value in reality. What is mentioned hereinbefore is an example of the present invention which is easy to be put into practice but never to limit the present invention. Therefore, it may be changed and modified for application without departing from the scope and spirit of the present invention; however, all the changes and modifications of the present invention remain included in the scope of the claims of the present invention.

I claim:

1. An improved automobile tire auxiliary device comprising a recess in the center of an outer edge surface of a claw plate, toothed faces being formed on the outer edge surface on the two sides of said recess, a lug being pivotably fastened at one end thereof in said recess in the claw plate, said lug having rows of adjustment holes provided in side surfaces thereof, rows of adjustment holes being formed in the surface of said claw plate on the two sides of said recess, said adjustment holes in said claw plate and said lug being adapted for receiving a pin therethrough for engaging said lug in a selected position with respect to the claw plate to form an integral body therewith for adjusting the lug up and down between plural outwardly extended positions and an inwardly concealed position in said recess wherein when said auxiliary device is mounted on the tire the friction between the tire and ground is selectively increased by outwardly extending said lug installed in said recess in the outer edge of said claw plate.

* * * * *